United States Patent [19]

Stroud

[11] Patent Number: 4,773,303
[45] Date of Patent: Sep. 27, 1988

[54] APPARATUS AND METHOD FOR READJUSTING PRESSURE RELIEF POPPET VALVES

[75] Inventor: Donald R. Stroud, Lafayette, Ind.
[73] Assignee: TRW Inc., Lyndhurst, Ohio
[21] Appl. No.: 136,146
[22] Filed: Dec. 21, 1987
[51] Int. Cl.$^4$ ................................................ F15B 9/10
[52] U.S. Cl. .................... 91/375 A; 91/401; 180/146; 92/13; 92/13.5; 92/13.6; 92/181 P
[58] Field of Search ................ 91/371, 375 R, 375 A, 91/401; 92/13, 13.5, 13.51, 13.6, 181 P, 183; 180/146, 147

[56] References Cited

U.S. PATENT DOCUMENTS

| | | | |
|---|---|---|---|
| 3,315,570 | 4/1967 | Brewer et al. | 91/401 |
| 3,896,703 | 7/1975 | Bertanza | 91/401 |
| 3,935,790 | 2/1976 | Goff. | |
| 4,028,996 | 6/1977 | Jablonsky | 91/401 |
| 4,625,624 | 12/1986 | Adams | 91/375 A |
| 4,648,307 | 3/1987 | Rabe. | |

OTHER PUBLICATIONS

U.S. application Ser. No. 073,711, filed Jul. 15, 1987, Inventors: William T. Rabe and Wendell L. Gilbert, for "Steerig Gear".

Primary Examiner—Robert E. Garrett
Assistant Examiner—Mark A. Williamson
Attorney, Agent, or Firm—Tarolli, Sundheim & Covell

[57] ABSTRACT

An apparatus for readjusting first and second adjustable pressure relief poppet valves to vent the fluid pressure moving a piston when the piston is at the ends of a second work stroke which is of a length less than a first work stroke for which the poppet valves are adjusted. Each of the poppet valves is carried by the piston and includes a valve seat and a valve member movable relative to the valve seat. The piston is disposed in a fluid chamber defined by a housing. The piston divides the fluid chamber into first and second chamber portions. One of the chamber portions is pressurized and the other is vented to move the piston in a work stroke. The apparatus includes a member supported by the housing for moving the seat of the second poppet valve outwardly relative to the piston in response to the member moving relative to the housing and engaging the seat of the first poppet valve to move the seat of the first poppet valve inwardly relative to the piston. The piston moves to one end of the second work stroke to engage the seat of the second poppet valve with a surface defining the fluid chamber to move the seat of the second poppet valve inwardly relative to the piston to an adjusted position enabling fluid communication between the first and second chamber portions when the piston is at the one end of the second work stroke.

12 Claims, 7 Drawing Sheets

APPARATUS AND METHOD FOR READJUSTING PRESSURE RELIEF POPPET VALVES

BACKGROUND OF THE INVENTION

1. Technical Field

The present invention relates to a fluid power assist steering gear. In particular, the present invention relates to pressure relief poppet valves in the steering gear and adjustment of such valves.

2. Description of the Prior Art

Fluid power assist steering gears for vehicles are known. One such steering gear is disclosed in U.S. Pat. No. 4,648,307. The steering gear disclosed in U.S. Pat. No. 4,648,307 includes a housing defining a fluid chamber. A piston divides the fluid chamber into first and second chamber portions. The piston is drivingly connected with a steering linkage to effect angular movement of steerable wheels of the vehicle when the piston moves. The piston moves through a work stroke due to fluid pressure acting in one of the chamber portions. A fluid flow control valve, when actuated, directs pressurized fluid into the one chamber portion and simultaneously vents the other chamber portion to effect movement of the piston. An input shaft is moved by the vehicle operator to actuate the control valve.

A vehicle typically has a pair of steering stops which limit the maximum amount of angular movement of the steerable wheels. One steering stop limits the amount of angular movement in one direction and the other steering stop limits the amount of angular movement in the opposite direction. Each of the steering stops is mounted on a part of the vehicle, such as an axle, and engages a part connected with one of steerable wheels upon movement of the steerable wheels the maximum angular amount in one direction.

A pair of pressure relief poppet valves are mounted at axially opposite ends of the piston. Each poppet valve relieves fluid pressure in a pressurized chamber portion just prior to the steerable wheels reaching a respective limit of angular movement in one respective direction and just prior to engagement of the part connected with one of the steerable wheels with a respective steering stop. Relieving pressure in the pressurized chamber portion when a steering stop is engaged prevents damage. Specifically, the power steering pump and the driving connection between the piston and the steering linkage are protected from hydraulic and mechanical loads which may be transmitted if the pressure is not relieved.

Each of the poppet valves includes a valve seat and a valve member which is movable relative to the valve seat. Fluid flow through a poppet valve is blocked when the valve member engages its valve seat. Fluid flow through the poppet valve is permitted when the valve member is moved to a postion not engaging its valve seat. The position of the valve seat relative to the piston is adjustable. The positions of the valve seats are adjusted by moving the piston to cause the valve seats to engage respective walls of the fluid chamber and to move relative to the piston on continued movement of the piston. Adjustment of the valve seats is effected initially by turning the steerable wheels of the vehicle in both directions until the steering stops engage the respective parts connected with the steerable wheels. The seats are thereby adjusted to positions so that a respective valve member engages a wall of the fluid chamber and moves away from its valve seat to vent the fluid pressure in a chamber portion through the poppet valve when the piston is near an end of its maximum work stroke which is just prior to a steering stop being engaged.

If for some reason the maximum amount of angular movement of the steerable wheels is decreased, the steering gear of U.S. Pat. No. 4,648,307 must be removed from the vehicle, disassembled and the poppet valve seats moved to a position so they may be automatically adjusted after reinstallation of the steering gear. For example, if tires of a larger diameter than the original tires are installed on the steerable wheels, the steering stops are reset to decrease the maximum amount of angular movement of the steerable wheels. The length of the maximum work stroke of the piston correspondingly decreases. Thus, the valve members cannot engage a wall of the fluid chamber to unseat and thereby vent the fluid pressure in a chamber portion moving the piston. Therefore, there would be no pressure relief when a steering stop is engaged and the aforementioned damage to the steering gear could occur.

SUMMARY OF THE INVENTION

The present invention provides an apparatus and method for readjusting the first and second pressure relief poppet valves of U.S. Pat. No. 4,648,307, when the maximum amount of angular movement of the steerable wheels is decreased, and without the necessity of disassembling the steering gear. The poppet valves are carried by a piston disposed in a fluid chamber defined by a housing. The piston divides the fluid chamber into first and second chamber portions. Each of the poppet valves includes a valve seat and a valve member which is movable relative to its valve seat. The position of the valve seat of each poppet valve relative to the piston is adjustable to establish an end of the maximum work stroke of the piston at which a steering stop is engaged and fluid pressure in a chamber portion, which moved the piston, is relieved.

When the maximum amount of angular movement of the steerable wheels is decreased, the maximum work stroke of the piston correspondingly decreases. The maximum amount of angular movement of the steerable wheels decreases when, for example, tires of a larger diameter or width than previous tires are installed on the steerable wheels of the vehicle. The maximum amount of angular movement of the steerable wheels is decreased by resetting the steering stops so that the larger tires do not rub against a part of the vehicle. Since the maximum amount of angular movement of the steerable wheels decreases, and the maximum work stroke of the piston decreases, the poppet valves on the piston must be readjusted to vent the fluid pressure moving the piston at a different position in the piston's movement.

The poppet valves are readjusted in a series of steps and by using an elongate adjuster member, preferably threaded into the housing of the steering gear. The elongate member, upon movement in one direction relative to the housing, moves the valve seat of a first poppet valve at one end of the piston inwardly relative to the piston to effect movement of the valve seat of the second poppet valve at the other end of the piston outwardly relative to the piston. The piston is then moved to the one end of the decreased work stroke and the valve seat of the second poppet valve engages a surface defining the fluid chamber. This causes the valve seat of the second poppet valve to move inwardly relative to the piston to an adjusted position. Thus, the valve member associated with the adjusted valve seat will move away from the adjusted valve seat to enable fluid communication between the first and second chamber portions when the piston is at or near the one end of the decreased work stroke. This vents the pressure acting to move the piston. Thus, the second poppet valve is readjusted for the decreased work stroke.

The elongate member is then moved relative to the housing in a direction opposite to its direction of movement to adjust the second poppet valve seat. The piston then is moved to the other end of the decreased work stroke. The elongate member is then moved into the housing to engage the first valve member and move it away from its valve seat to enable fluid communication between the first and second chamber portions when the piston is at or near the other end of the decreased work stroke. This readjusts the first poppet valve for the decreased stroke. Thus, both poppet valves are readjusted to vent the fluid pressure moving the piston at the ends of the maximum work stroke of the piston which is a decreased maximum work stroke.

The elongate member, which perferably has a threaded portion for threaded engagement with the housing, also has a drive portion for receiving a force to effect rotation of the elongate member to axially move the elongate member relative to the housing. Also, a tubular member is interposed between the poppet valve seats for engagement with both of the poppet valve seats and to move one poppet valve seat when the other poppet valve seat moves toward the one poppet valve seat.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
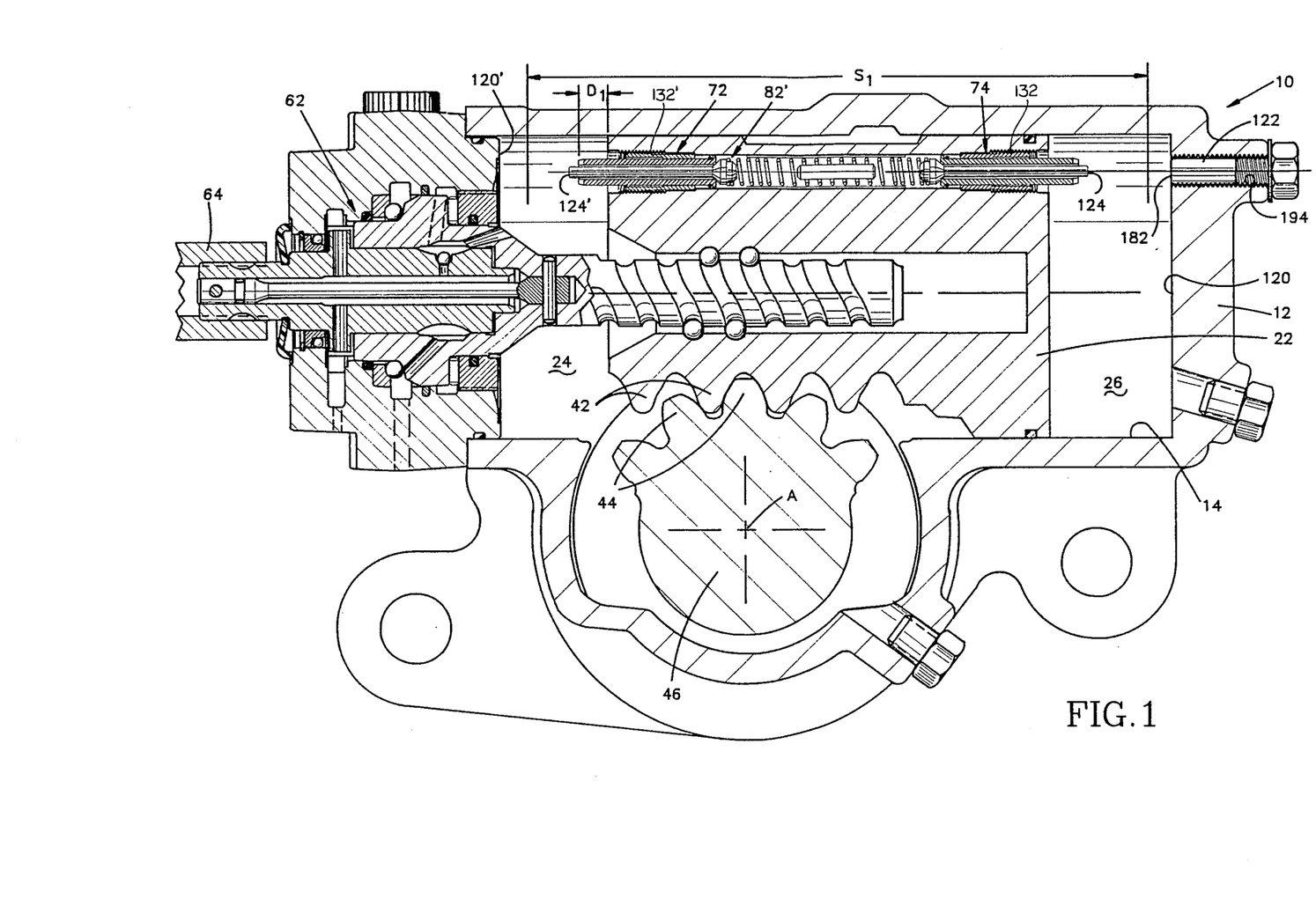
FIG. 1 is a cross sectional view of a steering gear having poppet valves which are adjustable in accordance with the present invention.
Figure 2:
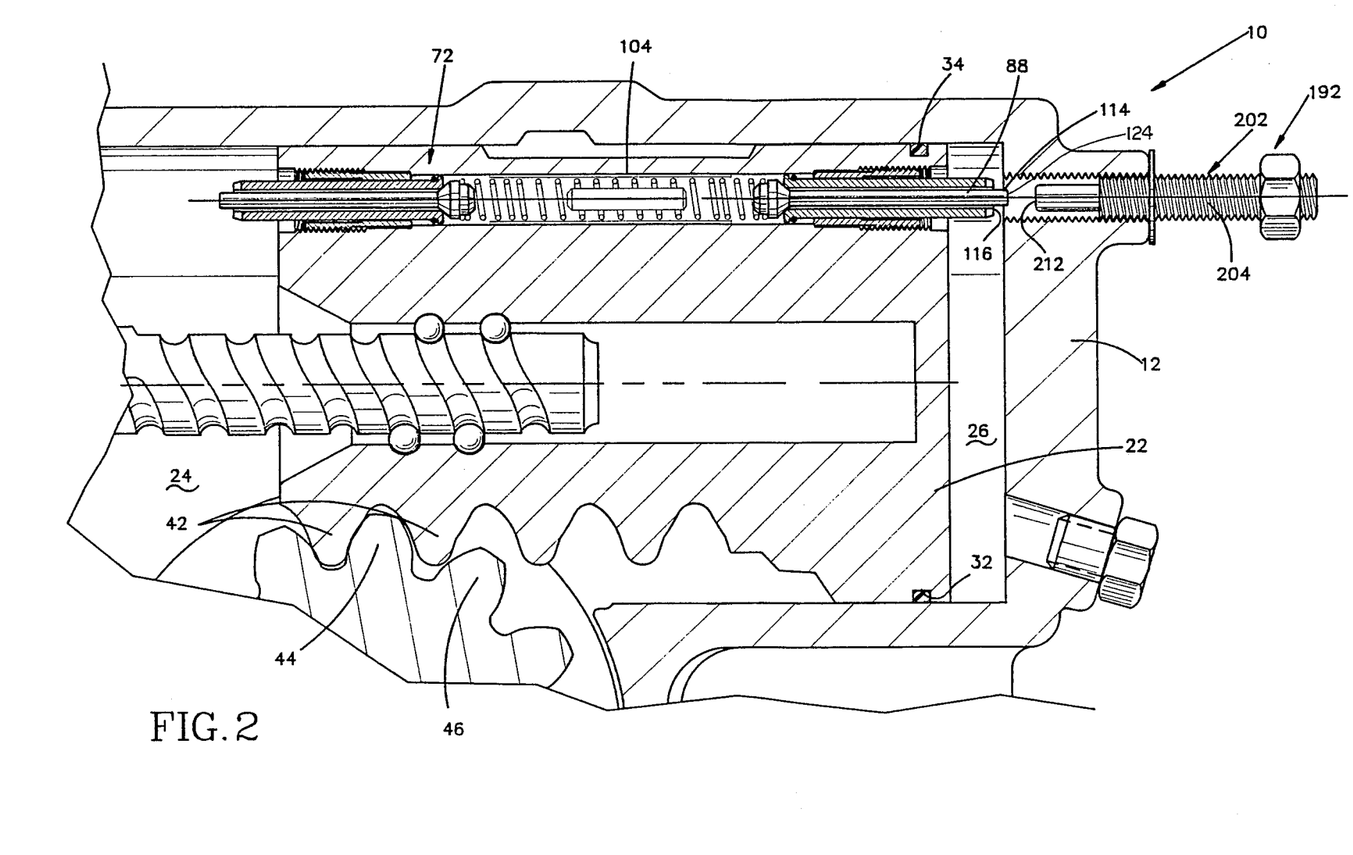
FIG. 2 is an enlarged portion of the steering gear of FIG. 1 illustrating an adjuster for use in readjusting the poppet valves and showing some of the parts of the steering gear in different positions.

A fluid power assist integral steering gear 10 for use in a vehicle is illustrated in FIG. 1. The steering gear 10 includes a housing 12. The housing 12 defines a cylindrical fluid chamber 14. A piston 22 is located in the fluid chamber 14. The piston 22 divides the fluid chamber 14 into a pair of chamber portions 24, 26. An annular groove 32 (FIG. 2) extends circumferentially about the piston 22. A seal 34 is located in the groove 32 and engages a cylindrical surface of the fluid chamber 14. The seal 34 prevents fluid leakage between the chamber portions 24 and 26.

A plurality of gear teeth 42 (FIG. 1) are formed on the piston 22. The gear teeth 42 on the piston 22 mesh with gear teeth 44 on a sector gear 46 supported for pivotal movement by the housing 12 about an axis A. The sector gear 46 is connected with a part of a steering linkage mechanism (not shown), such as a known pitman arm, to turn of the steerable wheels of the vehicle upon pivoting of the sector gear 46. Axial movement of the piston 22 pivots the sector gear 46. Pressurized fluid acts in one chamber portion 24 or 26 while the other chamber portion 26 or 24 is vented. This selective pressurization and venting of the chamber portions 24, 26 moves the piston 22 axially within the fluid chamber 14 in a work stroke. The amount of angular movement of the steerable wheels is proportional to the amount of rotation of the sector gear 46 which, in turn, is proportional to the length of the work stroke of the piston 22. While the length of the work stroke of the piston 22 can vary, the maximum length is designated S1.

A fluid flow control valve 62 controls the pressurization and venting of the chamber portions 24, 26. The valve 62 is connected to a steering input shaft 64 of the vehicle. The steering input shaft 64 is connected with the stering wheel of the vehicle, as is known, to actuate the valve 62 in response to rotation of the steering wheel. The valve 62 is of a known construction and will not be described in detail. U.S. patent application Ser. No. 073,711 filed July 15, 1987 discloses such a valve and is incorporated herein by reference.

The vehicle in which the steering gear 10 is used has steering stops (not shown) to mechanically limit the amount of angular movement of the steerable wheels of the vehicle. The steering stops prevent the tires of the vehicle from engaging the body or frame during steering. A steering stop is located on the axle of the vehicle and engages a part connected with a steerable wheel and which turns during steering. Such steering stops are known and will not be described in detail.

In order to stop movement of the piston 22 at the ends of the maximum length of the work stroke, a pair of fluid pressure relief poppet valves 72, 74 are provided. The poppet valves 72, 74 are carried by the piston 22 at axially opposite ends of the piston. The poppet valves 72, 74 vent fluid pressure in one of the chamber portions 24, 26 just prior to the piston 22 reaching an end of the maximum work stroke. As a result, the power steering pump, the teeth 42 on the piston 22 and the teeth 44 on the sector gear 46 are protected from repeated hydraulic and mechanical loads which may be transmitted through the steering gear 10, as is known.

Each of the poppet valves 72, 74 are of identical construction. Thus, only one poppet valve 74 will be described in detail. The same reference numbers will be used to designate like parts of the poppet valves 72, 74 but a prime (') will be added to the reference numbers to designate the parts of the poppet valve 72. The poppet valve 74 (FIG. 3) includes a tubular valve seat 82 and a valve member 84. The valve member 84 has a head portion 86 and a stem portion 88. The head portion 86 has a frustoconical valve face 92 which engages a frustoconical surface 94 on the valve seat 82 to block fluid flow through the poppet valve 74. The valve member 84 is biased by a spring 102 into engagement with the valve seat 82. When the valve face 92 of the valve member 84 is moved from engagement with the surface 94 of the valve seat 82, fluid flow through the poppet valve 74 is allowed.

The stem portion 88 of the valve member 84 extends coaxially through the valve seat 82. The radial clearance between the valve stem 88 and valve seat 82 defines a fluid passage 112. The valve stem 88 has a tip portion 114 (FIG. 2) with an end surface 124 which projects beyond an end surface 116 of the valve seat 82 when the valve face 92 engages the surface 94 of the valve seat. A slot 118 (FIG. 3) extends radially in the end surface 116 of the valve seat 82. The slot 118 allows fluid communication to be maintained between the chamber portion 26 and the passage 112 when the end surface 116 of the valve seat 82 engages an end surface 120' of the fluid chamber 14 or a plug 122 (FIG. 1).

When fluid pressure acts in the chamber portion 24, the piston 22 is moved to the right, as viewed in FIG. 1. The fluid pressure in the chamber portion 24 acts on the end surface 124' of valve member 84' of the poppet valve 72 and on a portion of the valve head 86' in the passage 112' tending to move the valve member 84' to the right relative to the valve seat 82'. When the force of the fluid pressure acting on the valve member 84' is sufficiently large to overcome the bias of spring 102, the face 92' of the valve member moves to a position away from the valve seat surface 94'. As a result, the fluid pressure in the chamber portion 24 is communicated through the poppet valve 72 and into the passage 106 in the piston 22.

As the piston 22 nears the right end of its maximum work stroke, the end surface 124 of the valve member 84 of the poppet valve 74 engages the plug 122. On continued movement of the piston 22 to the right, the valve member 84 moves relative to the valve seat 82 causing the valve face 92 to move away from the surface 94 of the valve seat. This allows the fluid in the passage 106 communicated from the chamber portion 24 to flow past the valve head 86 and into the chamber portion 26 which is being vented through the control valve 62. This vents the fluid pressure moving the piston 22. If the piston 22 moves in the opposite direction, it should be apparent that fluid pressure in chamber portion 26 moving the piston would be communicated to the chamber portion 24 and vented through the control valve 62 in a manner similar to that described above.

The valve seat 82 (FIG. 3) is supported in the piston 22 by a threaded connector 132. The threaded connector 132 has an externally threaded portion 134 which threads into an internally threaded portion of the passage 106. The externally threaded portion 134 is located at one axial end portion of the connector 132. Another end portion 136 of the threaded connector 132 has an inner cylindrical surface 142 which is received on a portion of an outer surface 144 of the valve seat 82. The diameter of the outer surface 144 of the valve seat 82, prior to assembly, is slightly greater than the diameter of the inner surface 142 of the threaded connector 132. Thus, a slight interference fit results which is sufficient to prevent relative movement between the valve seat 82 and threaded connector 132 due to normal operating fluid pressures in the steering gear 10. However, the interference fit will permit the valve seat 82 to move relative to the threaded connector 132 under the influence of a relatively large external force applied to the valve seat.

The outer diameter of the end portion 136 of the threaded connector 132 is smaller than the inner diameter of a portion 160 of the passage 106. Thus, a clearance 162 exists between the end portion 136 and the portion 160 of the passage 106 in the piston 22. A similar clearance 164 exists between the valve seat 82 and the threaded connector 132. The clearances 162, 164 assure that the threaded connector 132 and valve seat 82 will not be deformed due to the interference fit, which could restrict relative movement between the valve seat and threaded connector. A retaining ring 172 is fixed on the valve seat 82 to limit the amount of axial movement of the valve seat within the threaded connector 132 to the right, as viewed in FIG. 3.

The interference fit enables the position of the valve seat 82 relative to the piston 22 to be adjusted. Once the steering gear 10 is installed in the vehicle, the steering wheel of the vehicle is turned in both directions until the steering stops engage. Adjustment of the poppet valves 72, 74 is effected by such turning, as described in U.S. Pat. No. 4,648,307.

As the steering wheel is turned, for example, to move the piston 22 to the left end of its maximum work stroke, as viewed in FIG. 1. The end surface 124' of the valve member 84' engages the surface 120' of the fluid chamber 14 to unseat the valve 92' from the surface 94' of the valve seat 82'. If the steering stop has not been engaged, the steering wheel can still be rotated and the piston 22 continues to move to the left. The end surface 116' of valve seat 82' then engages the surface 120' of the fluid chamber 14 and the valve seat 82' moves axially inwardly or to the right relative to the piston 22 and threaded connector 132'. The interference fit between the valve seat 82' and threaded connector 132' is overcome by continued movement of the piston 22 until the steering stop is engaged and the valve seat 82' extends a distance D1 beyond the piston 22. The same procedure is used to adjust the poppet valve 74 by moving the piston 22 to the right as viewed in FIG. 1.

The steering stops are, which are adjustable, are reset to adjust the maximum amount of angular movement of the steerable wheels. The maximum length of a work stroke of the piston 22 changes when tires of a different diameter than the original tires are installed on the steerable wheels and the steering stops are reset. Movement of the piston 22, due to fluid pressure acting in one of the chamber portions 24, 26, should be stopped to establish the ends of the maximum length of the piston work stroke just prior to engagement of a steering stop.

If tires of a smaller diameter than the original tires are installed on the steerable wheels of the vehicle, readjustment of the poppet valves 72, 74 is required. The piston 22 moves in a maximum work stroke of a greater length than the maximum work stroke established with the original tires. The poppet valves 72, 74 are adjusted, by the procedure described above. Upon reaching the respective ends of the longer work stroke for the first time by turning the steerable wheels in both directions until the steering stops engage, the poppet valve seats 72, 74 are moved further inwardly relative to the piston 22 from the original adjusted position.

The poppet valves 72, 74 must also be readjusted when the steering stops are reset to decrease the maximum amount of movement of the steerable wheels. The steering stops are reset, for example, if tires of a larger diameter or width than the original tires are installed on the steerable wheels of the vehicle. Resetting the steering stops prevents the larger tires from contacting body or frame parts of the vehicle. The piston 22, thus, travels in a shorter maximum work stroke of a decreased length S2 (FIG. 7) before the steering stops are engaged than it did with the original tires. The valve members 84', 84 may not extend far enough beyond the piston 22 to engage the surface 120' of the fluid chamber 14 or plug 122, respectively, at the ends of the shorter maximum work stroke S2.

The present invention provides an adjuster 192 (FIG. 2) and method for readjusting the poppet valves 72, 74 when the piston moves in a shorter maximum work stroke than when the poppet valves were originally set. The plug 122 (FIG. 1) is removed from the threaded opening 194 in the housing 12. The adjuster 192 (FIG. 2) replaces the plug 122 in the housing 12. The adjuster 192 includes an elongate member 202 having a threaded portion 204 for threaded engagement with the threaded opening 194 in the housing 12. The elongate member 202, also has a drive portion 206 (FIG. 3) for receiving a suitable tool 208 to rotate the elongate member to effect axial movement of the elongate member relative to the housing 12. Upon rotation of the elongate member 202 in one direction, the elongate member advances or moves in a direction toward the piston 22. Upon rotation of the elongate member 202 in the opposite direction, the elongate member moves in a direction away from the piston 22.

Figure 3:
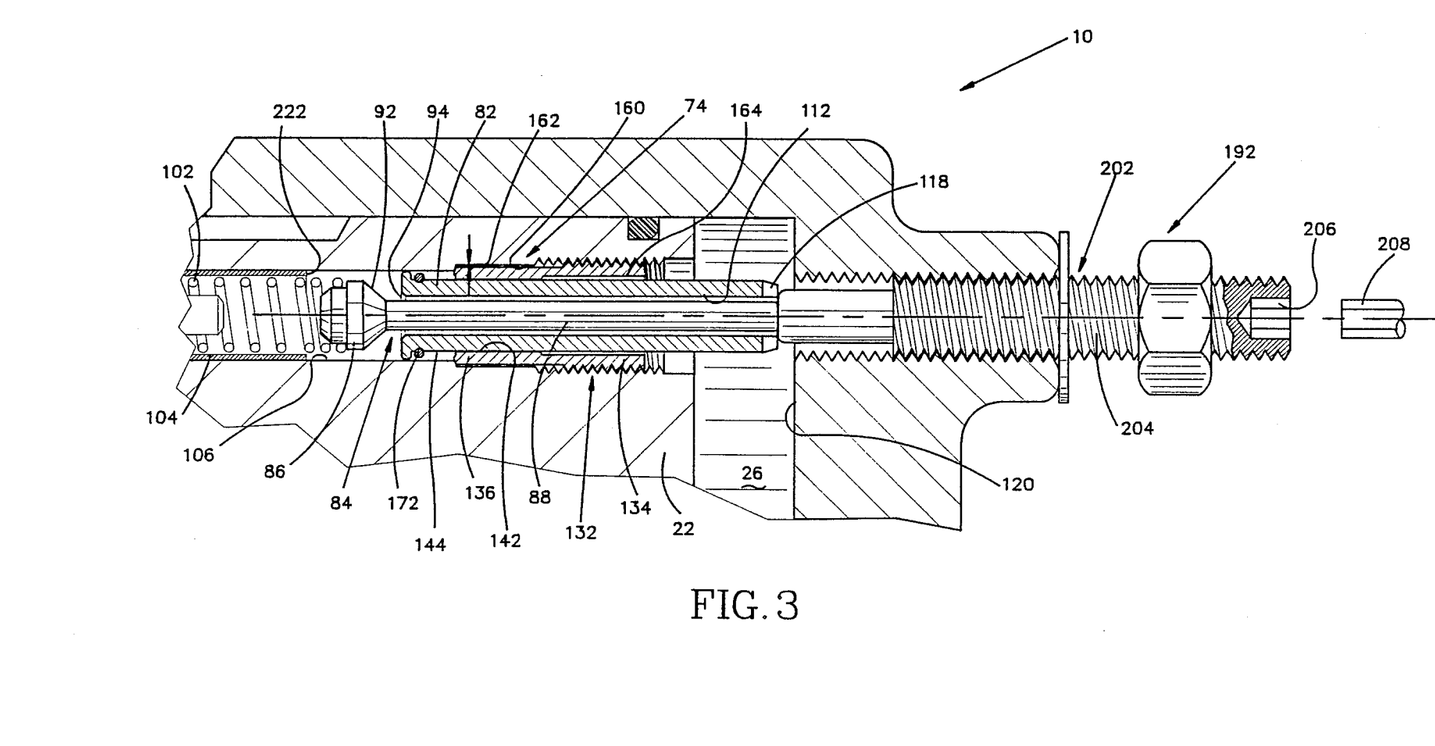
FIGS. 3-6 are views similar to FIG. 2 illustrating the readjustment of the poppet valves and showing some of the parts of the steering gear in different positions.
Figure 4:
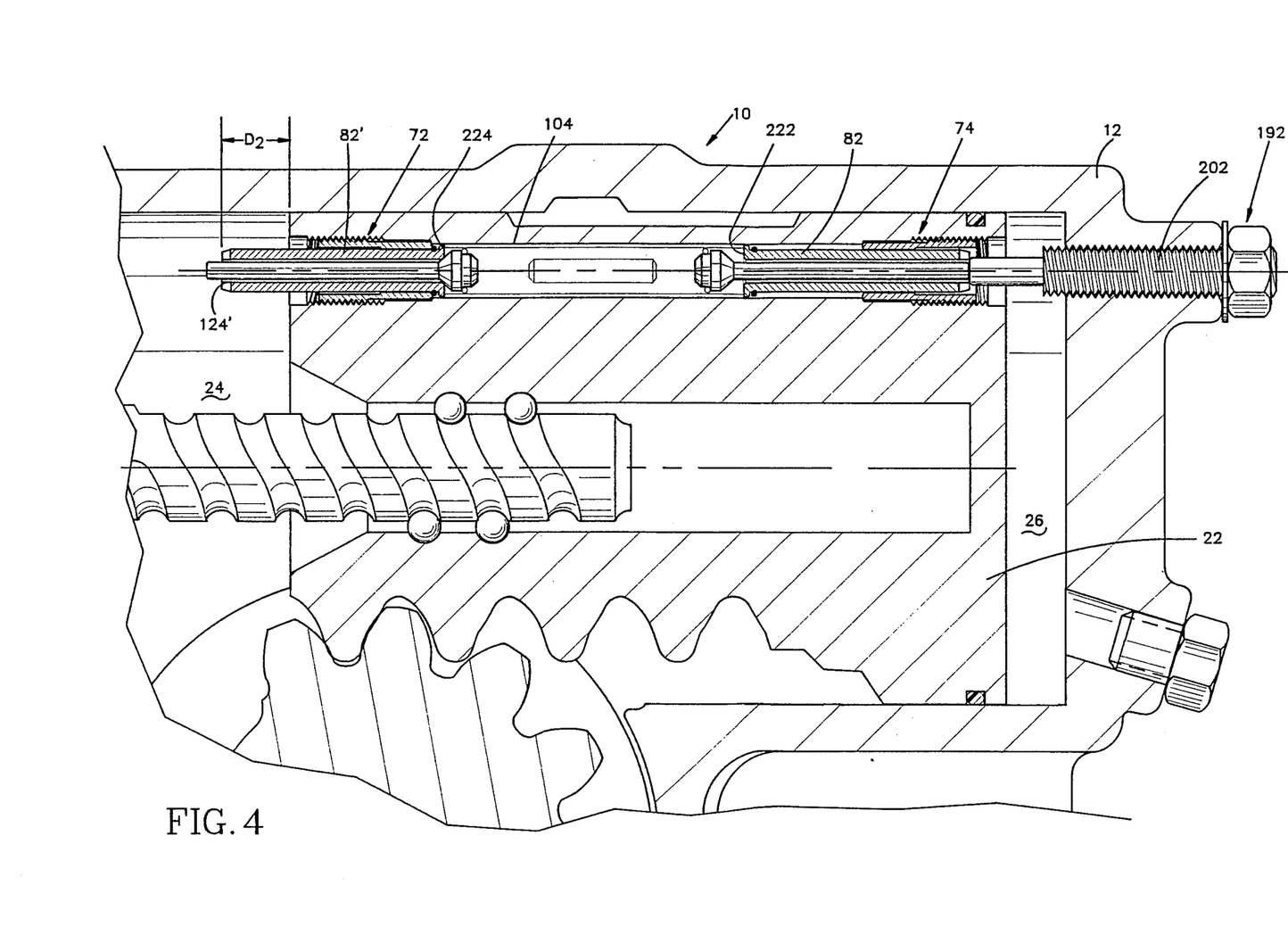
Figure 7:
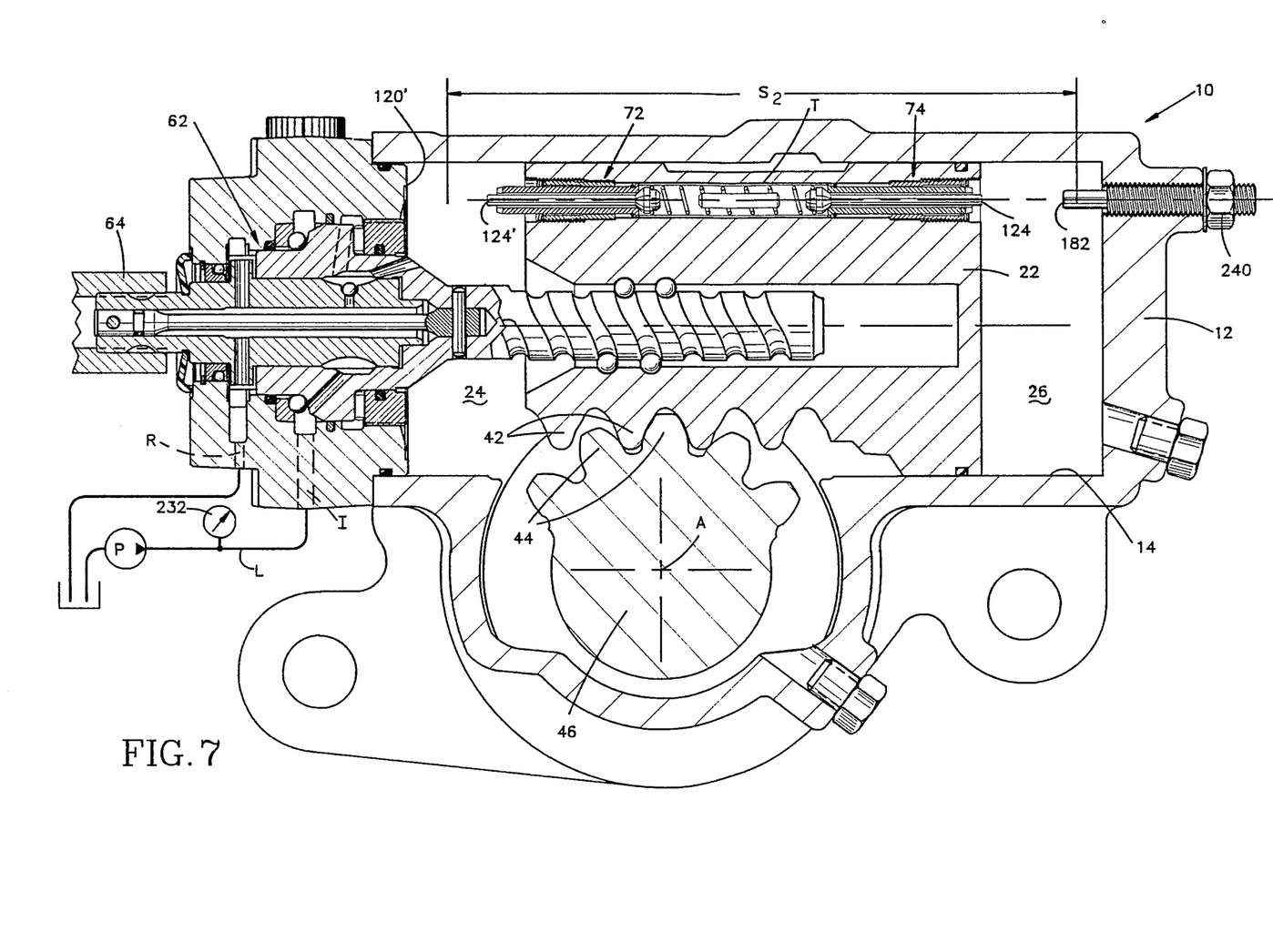
FIG. 7 is a view of the steering gear of FIG. 1 after readjustment of the poppet valves is complete.

The piston 22 is then moved to the right end of the shorter maximum work stroke S2, as viewed in FIG. 7, which corresponds to one of the steering stops being engaged. The elongate member 202 of the adjuster 192 is then rotated to move in a direction toward the piston 22. As the elongate member 202 moves in a direction toward the piston 22, an end surface 212 of the elongate member 202 engages the valve member 84 and then the valve seat 82 of the poppet valve 74, as illustrated in FIG. 3. The elongate member 202 is rotated to continue moving toward the piston 22 to force the valve seat 82 of the poppet valve 74 to move inwardly relative to the piston and engage the right end 222 of a tubular member 104 located in the passage 106 and around the spring 102. The tubular member 104 moves to the left within the passage 106. As illustrated in FIG. 4, the axially opposite or left end 224 of the tubular member 104 then engages the valve seat 82' of the poppet valve 72 and moves the valve seat 82' outwardly relative to the piston 22 from its original position. The valve seat 82' of the poppet valve 72 extends beyond the left end surface of the piston a distance D2 which is greater than the distance D1 which the valve seat 82' originally extended. The greater extent of the valve seat 82' beyond the piston 22 is necessary to compensate for the shorter maximum work stroke S2 of the piston to enable readjustment of the poppet valve 72.

Figure 5:
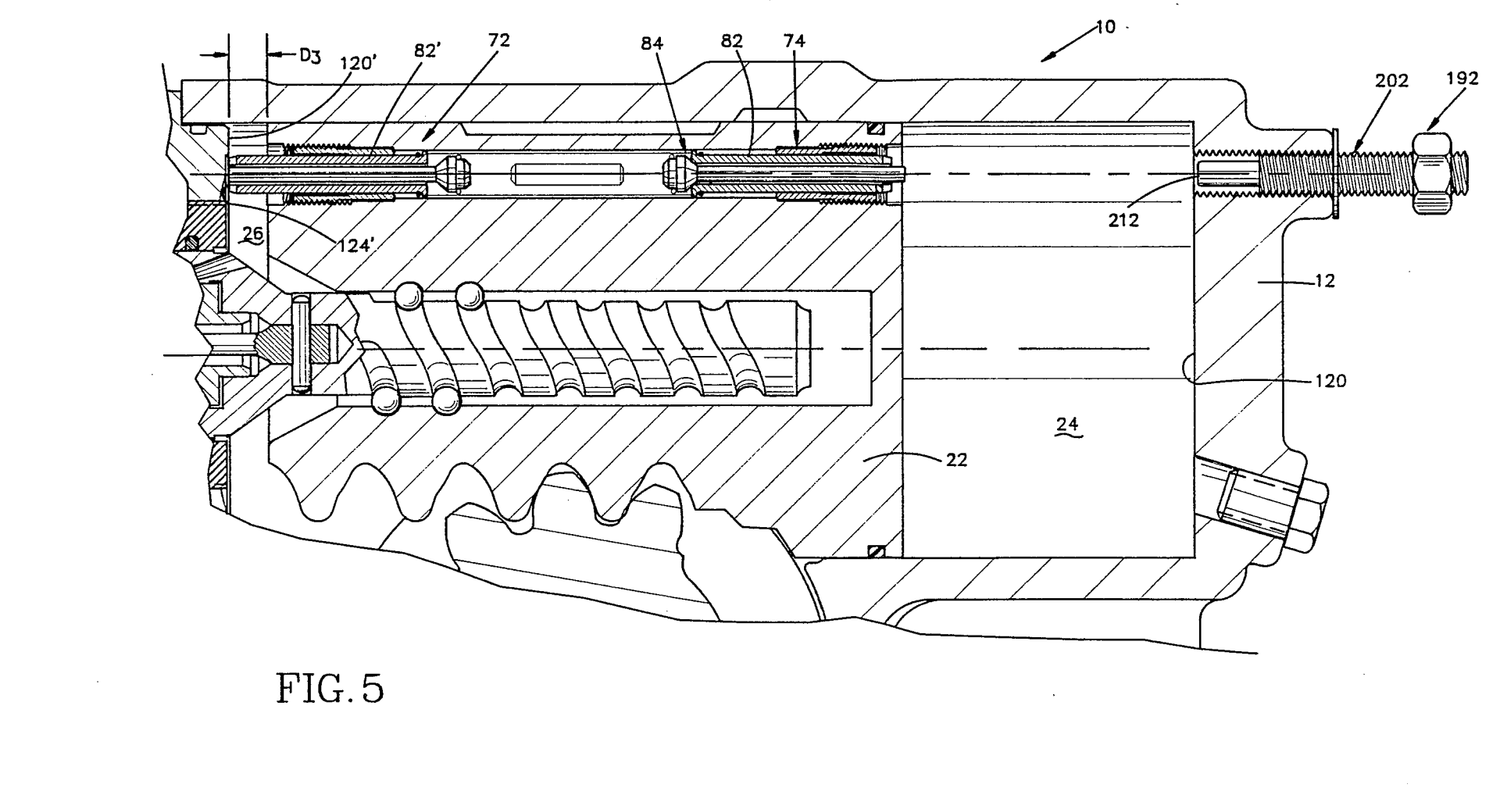

The piston 22 is then moved to the left end of the shorter maximum work stroke S2, as viewed in FIG. 5, by turning the steering wheel of the vehicle. The end surface 124' of the valve seat 82' engages the surface 120' of the fluid chamber 14 and the valve seat moves inwardly to the right relative to the piston 22. The poppet valve 72, thus, has a readjusted position in which fluid communication is enabled between the chamber portions 24 and 26 when the piston 22 is at the left end of the shorter work stroke S2. The valve seat 82' extends a distance D3 beyond the end of the piston 22. The distance D3 is less than the distance D2 but greater than the distance D1.

The tubular member 104 moves to the right within the passage 106 during the movement of the valve seat 82' of the poppet valve 72 to the new adjusted position. The tubular member 104 moves the valve seat 82 of the poppet valve 74 to the right relative to the piston 22. However, the valve seat 82 of the poppet valve 74 does not extend from the piston 22 beyond its originally adjusted position.

To readjust the poppet valve 74, the elongate member 202 is moved relative to the housing 12 so its end surface 212 is located to the right of the end surface 120 of the chamber 14, as viewed in FIG. 5. A fluid pressure gauge 232 is connected to the fluid supply line L (FIG. 7) between the power steering pump P and an inlet port I of the steering gear 10, as schematically illustrated in FIG. 7. The engine of the vehicle is operated to drive the power steering pump P so fluid pressure is communicated to the steering gear 10, as is known. The steering wheel of the vehicle is then turned to move the piston 22 to the right end of the shorter maximum work stroke S2, as viewed in FIG. 6.

Figure 6:
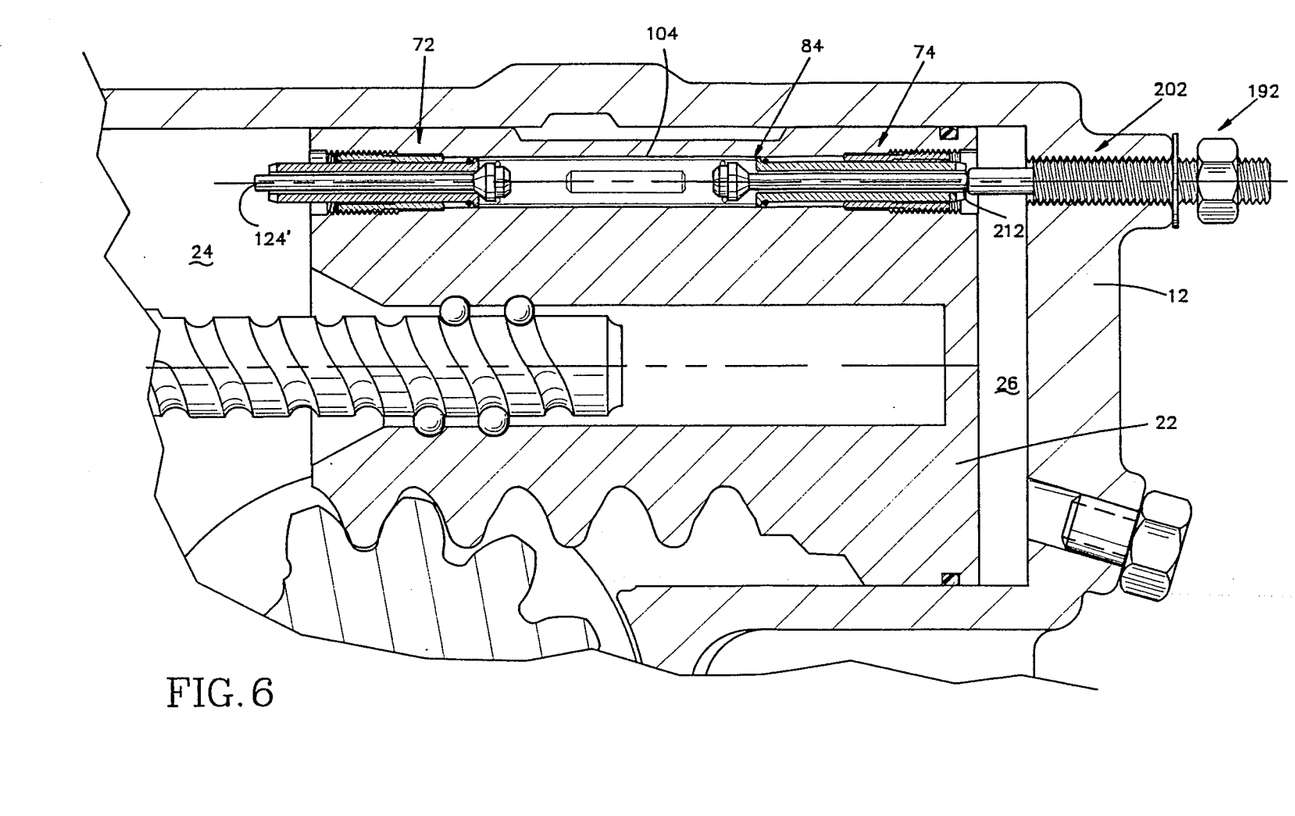

The elongate member 202 is then rotated to move in a direction toward the poppet valve 74. The end surface 212 of the elongate member 202 engages the valve member 84 of the poppet valve 74. The elongate member 202 is advanced until the valve member 84 of the poppet valve 74 unseats to enable fluid flow through the poppet valve. The elongate member 202 is advanced to move the valve member 84 from the valve seat 82 until the fluid pressure in the supply line L is lowered to a predetermined level of pressure. The predetermined pressure level is sufficiently low to assure that a relatively low force is being exerted against the piston 22 to prevent damage to the hydraulic system and parts of the steering gear 10.

The position of the elongate member 202 relative to the housing 12, thus, enables fluid communication between the chamber portions 24, 26 portions when the piston 22 is at the right end of the shorter work stroke S2. A jam nut 240 of the adjuster 192 is then threaded onto the threaded portion 240 of the elongate member 202. The jam nut 240 is rotated to engage the housing 12 to prevent the elongate member 202 from moving from the adjusted position. The fluid pressure gauge 232 is then removed from the supply line L.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim the following:

1. An apparatus for readjusting first and second adjustable pressure relief poppet valves to vent the fluid pressure moving a piston when the piston is at the end of a second work stroke which is of a length less than a first work stroke for which the poppet valves are adjusted, each of the poppet valves being carried by the piston and having a valve seat and a valve member movable relative to the valve seat, the piston being disposed in a fluid chamber defined by a housing and the piston dividing the fluid chamber into first and second chamber portions one of which is pressurized and the other of which is connected to vent to cause the piston to move in its work stroke, said apparatus comprising:

a member movably supported by the housing for moving the seat of the second poppet valve outwardly relative to the piston upon said member moving relative to the housing and engaging the seat of the first poppet valve to move the seat of the first poppet valve inwardly relative to the piston; and means for moving the piston to one end of the second work stroke to engage the seat of the second poppet valve with a surface defining the chamber to move the seat of the second poppet valve inwardly relative to the piston to a readjusted position enabling fluid communication between the first and second fluid chamber portions when the piston is at the one end of the second work stroke.

2. The apparatus set forth in claim 1 wherein said member is movable relative to said housing to a position in which said member engages and moves the valve member of the first poppet valve relative to its valve seat enabling fluid communication between the first and second chamber portions when the piston is at the other end of the second work stroke, said means for moving the piston to one end of the second work stroke also comprising means for moving the piston to the other end of the second work stroke.

3. The apparatus set forth in claim 2 wherein said member has an external threaded portion in threaded engagement with said housing, said member having a drive portion for receiving a force to effect rotation of said member in one direction to move said member in a first direction relative to the housing and to effect rotation of said member in another opposite direction to move said member in an opposite second direction relative to the housing.

4. The apparatus set forth in claim 1 wherein said member has an external threaded portion in threaded engagement with said housing, said member having a drive portion for receiving a force to effect rotation of said member in one direction to move said member in a first direction relative to the housing and to effect rotation of said member in another opposite direction to axially move said member in a second opposite direction relative to the housing.

5. The apparatus set forth in claim 4 further including means for blocking rotation member comprising a nut for threaded engagement with said threaded portion of said member and for abutting engagement with the housing.

6. The apparatus set forth in claim 1 further including a tubular member interposed between the first and second poppet valve seats for engagement therewith to effect said movement the second poppet valve seat outwardly relative to the piston upon movement of the first poppet valve seat in a direction toward the second poppet valve seat.

7. A steering gear comprising:
a housing having a fluid chamber;
a piston disposed in said fluid chamber and dividing said fluid chamber into first and second chamber portions, said piston being axially movable within said fluid chamber through a first work stroke of a first length or through a second work stroke of a second length which is less than the first length;
actuatable valve means for directing fluid pressure into one of said first and second chamber portions and for simultaneously venting the other of said first and second chamber portions to effect axial movement of said piston;
a steering input member movable for effecting actuation of said valve means;
relief valve means for communicating said first and second chamber portions when said piston is near respective ends of a work stroke, said relief valve means carried by said piston and comprising a pair of poppet valves, each of said pair of poppet valves including a valve seat and a valve member which is movable relative to said valve seat between a closed position blocking fluid communication between said first and second chamber portions and an open position enabling fluid communication between said first and second chamber portions;
means for enabling movement of each valve seat relative to said piston in response to movement of said steering input member to move said piston to the ends of the first work stroke to effect fluid communication between said first and second chamber portions; and
a movable member carried by said housing for engaging the valve seat of a first one of said pair of poppet valves and moving said valve seat to effect movement of the valve seat of a second one of said pair of poppet valves upon movement of said member relative to said housing thereby enabling adjustment of the position of said valve seat of said second one of said pair of poppet valves when said piston is moved to a first end of the second work stroke.

8. The steering gear set forth in claim 7 wherein said member is movable relative to said housing to a position for engaging the valve member of said first one of said pair of poppet valves upon movement of said piston to a second end of the second work stroke to move the valve member relative to its seat to enable fluid communication between said first and second chamber portions when said piston is at the second end of the second work stroke.

9. The steering gear set forth in claim 7 further including a tubular member interposed between said pair of poppet valve seats for engagement therewith to effect movement of said valve seat of said second one of said pair of poppet valves upon movement of said valve seat of said first one of said pair of poppet valves in a direction towards said valve seat of said second one of said pair of poppet valves.

10. The steering gear set forth in claim 7 wherein said member has an external threaded portion in threaded engagement with said housing, said adjustment member has a drive portion for receiving a force to effect rotation of said adjustment member in one direction to axially move said member in a first direction relative to said housing and to effect rotation of said adjustment member in another opposite direction to move said member in a second opposite direction relative to said housing.

11. A method for readjusting first and second adjustable pressure relief poppet valves to vent the pressure moving a piston when the piston is at the ends of a second work stroke which is of a length less than a first work stroke for which the poppet valves are adjusted, each of the poppet valves being carried by the piston and including a seat and a valve member movable relative to the seat, the piston being disposed in a fluid chamber defined by a housing and the piston dividing the fluid chamber into first and second chamber portions one of which is pressurized and the other of which is connected to vent to cause the piston to move in its work stroke, said method comprising:
moving the seat of a second one of the poppet valves outwardly relative to the piston by engaging a seat of a first one of the poppet valves with an end surface of a member carried by the housing and moving the member relative to the housing to force the seat of the first poppet valve to move the seat of the second poppet valve outwardly of the housing;

moving the piston to one end of the second work stroke so the seat of the second poppet valve engages a surface defining the fluid chamber to move the seat of the second poppet valve inwardly relative to the piston to a readjusted position enabling fluid communication between the first and second fluid chamber portions when the piston is at the one end of the second work stroke;

moving the piston to the other end of the second work stroke; and moving the member relative to the housing to move the valve member of the first poppet valve relative to the seat to a postion enabling fluid communication between the first and second chamber portions when the piston is at the other end of the second work stroke.

12. The method set forth in claim 11 wherein movement of the piston moves steerable wheels which engage an adjustable stop at respective ends of the work stroke of the piston and further including the step of resetting the position of the stops to establish limits of movement of the steerable wheels to be proportional to the second work stroke.

* * * * *